July 13, 1965  L. D. HAGENBOOK  3,194,391
IMPACT ABSORBING SHAKER CONVEYOR DRIVE
Filed Nov. 23, 1962  3 Sheets-Sheet 1
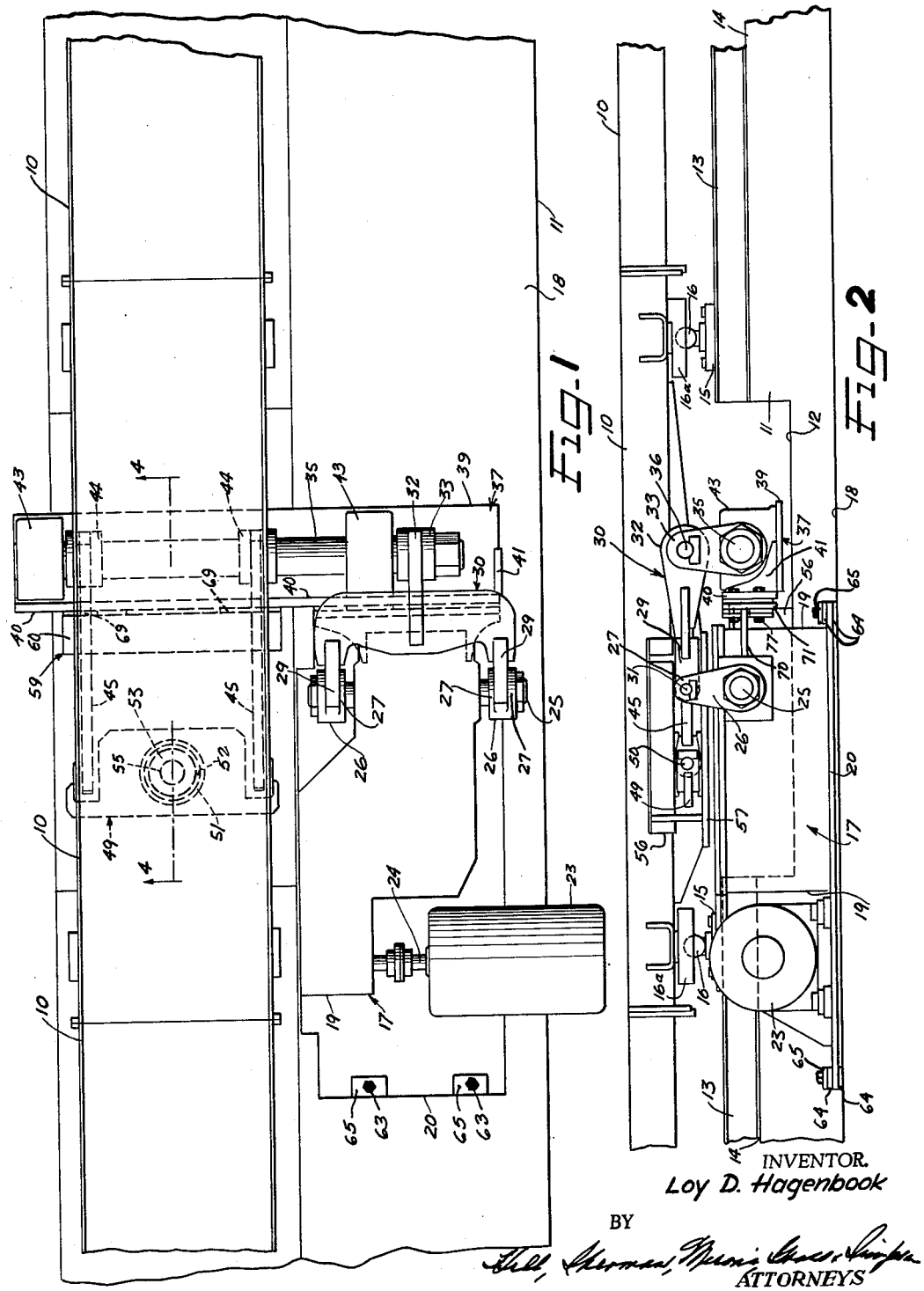
INVENTOR.
Loy D. Hagenbook
BY
ATTORNEYS

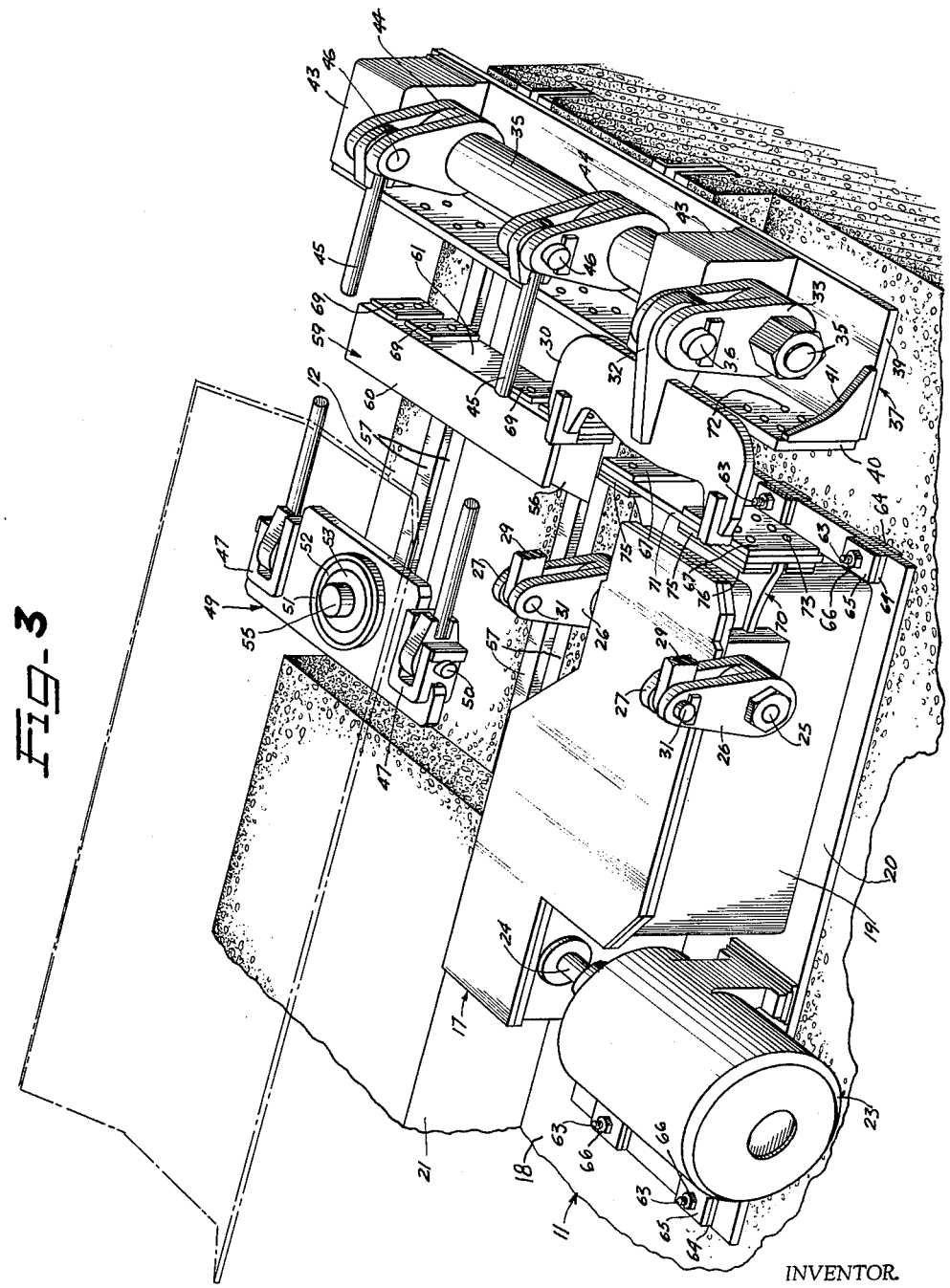

July 13, 1965  L. D. HAGENBOOK  3,194,391
IMPACT ABSORBING SHAKER CONVEYOR DRIVE
Filed Nov. 23, 1962  3 Sheets-Sheet 3
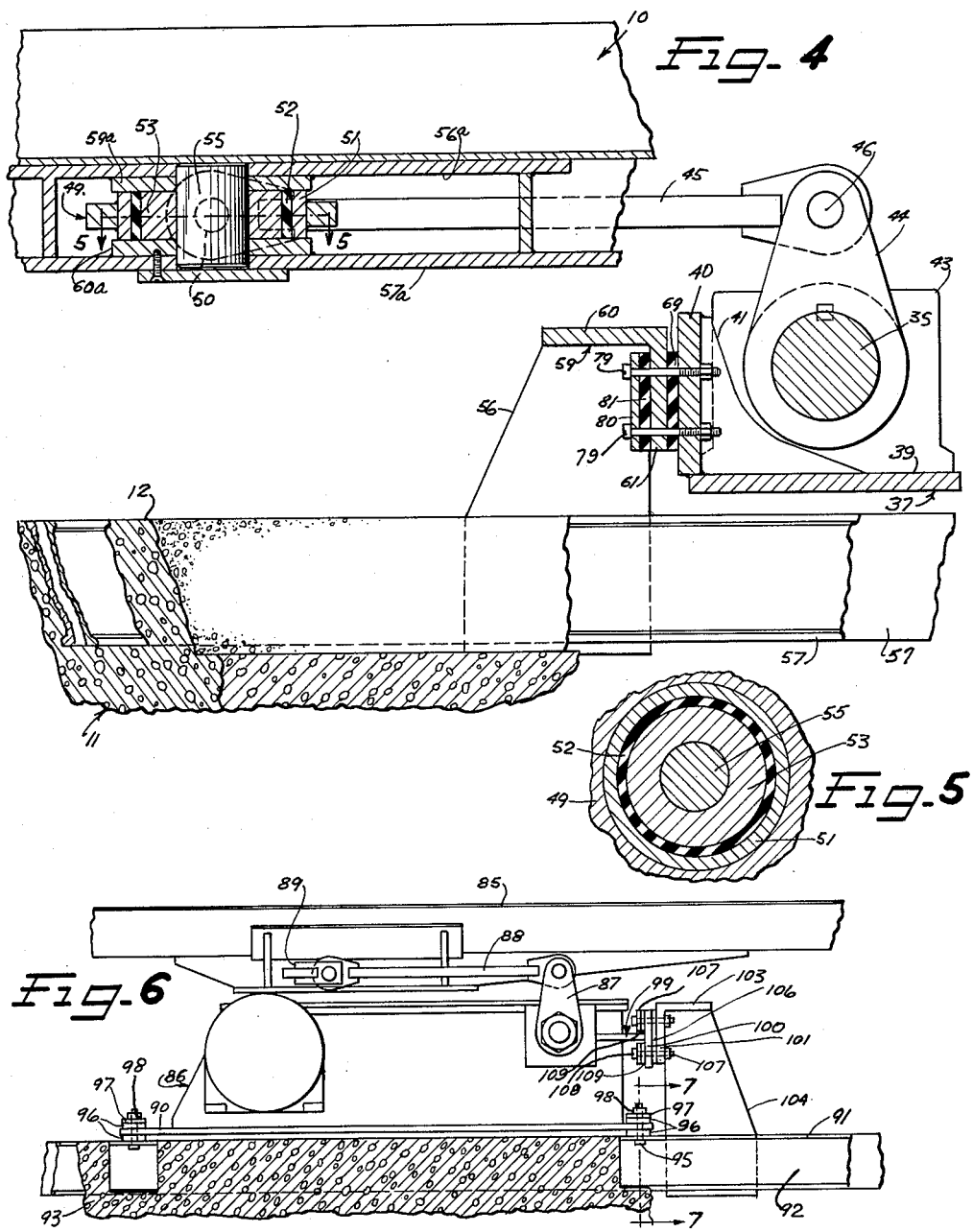
INVENTOR.
Loy D. Hagenbook
BY
ATTORNEYS United States Patent Office 3,194,391
Patented July 13, 1965

3,194,391
IMPACT ABSORBING SHAKER CONVEYOR DRIVE
Loy D. Hagenbook, Chicago, Ill., assignor to Goodman Manufacturing Company, Chicago, Ill., a corporation of Illinois
Filed Nov. 23, 1962, Ser. No. 239,449
11 Claims. (Cl. 198—220)

This invention relates to improvements in shaker conveyors and more particularly relates to such conveyors adapted to handle hot heavy abrasive material.

Shaker conveyors have heretofore been used in industrial installations and particularly in foundries to convey castings, scrap, sprues and gates, scale and molding sand. Such conveyors are rigidly mounted on a permanent base or foundation and are generally subject to heavy maintenance due to the impact forces that develop due to the changes in acceleration occurring near the middle of the strokes of the conveyor trough line in conjunction with back lash existing between the gear teeth and pins and bushings in the power train, which tend to tear up the drive mechanism and housing therefor.

While shock or impact absorbing elements may be introduced in the drive to the trough line, such elements tend to modify the conveying action to the extent that the trough line will not convey at the proper speed. In fact, cushioning of the joints and the mounting of the drive can so modify the accelerating producing forces of the drive mechanism, that the drive will last indefinitely without maintenance or repair. Such a conveyor, however, will no longer operate as a shaker conveyor.

A principal object of the present invention is to remedy the foregoing deficiences in shaker conveyors and drive mechanisms therefor by introducing impact absorption elements at selected points in the connection from the drive mechanism to the trough line, to sufficiently modify the forces, produced with changes in direction of acceleration and back lash, to save wear without detracting from the essential character of the conveyor as a shaker drive mechanism.

A further object of the invention is to improve upon the shaker conveyor drive mechanisms heretofore in use in industrial installations for conveying heavy material, by floatingly mounting the drive mechanism on a permanent base, and by transmitting the thrust reactions of the drive mechanism directly to the ground at a point spaced from the base and in substantial alignment with the driving forces to the trough line.

A still further object of the invention is to increase the maintenance free life of shaker conveyor drive units by supporting the drive unit on a base for shiftable movement relative to the base, by providing a thrust reaction member transmitting the thrust reactions of the drive mechanism to the ground, and by interposing impact absorbing elements between the drive mechanism and thrust reaction member, allowing the drive unit to shift on the base relative to the thrust reaction member, and to thereby relieve the drive unit from driving impact strains.

Still another object of the invention is to increase the maintenance free life of shaker conveyors utilized for conveying castings and other heavy material in steel mills, foundries and the like, by floatingly mounting the drive unit on a permanent base and transmitting the forces of conveying to the ground by a thrust absorbing member in general alignment with the trough line, and by connecting the drive unit to the thrust reaction member through force absorbing elements introducing sufficient force absorption to minimize wear on the drive unit without impairing the ability of the trough line to progress material therealong.

These and other objects of the invention will appear from time to time as the following specification proceeds and with reference to the accompanying drawings wherein:

FIGURE 1 is a fragmentary plan view of the shaker conveyor unit constructed in accordance with the invention;

FIGURE 2 is a view in side elevation of the unit shown in FIGURE 1;

FIGURE 3 is a perspective view of the shaker conveyor drive unit showing a conveying trough in phantom;

FIGURE 4 is a fragmentary sectional view taken substantially along line 4—4 of FIGURE 1;

FIGURE 5 is an enlarged fragmentary sectional view taken substantially along the line 5—5 of FIGURE 4;

FIGURE 6 is a view in side elevation of a drive mechanism and conveying unit with the base therefor shown in section, and illustrating a modified form in which my invention may be embodied; and FIGURE 7 is a fragmentary sectional view taken substantially along line 7—7 of FIGURE 6.

In FIGURES 1 and 2 of the drawings, I have shown a series of connected conveyor troughs 10, forming a shaker conveyor trough line, and supported for reciprocable movement with respect to a base 11, which may be a reinforced concrete base permanently formed on the floor of a foundry. The base 11 is shown as having a plurality of levels having a central recessed portion 12 having beams 13 extending along said base on an upper level 14, at opposite ends of said recessed portion. The beams 13 form supports for roller supports 15 having rollers 16 mounted thereon and engaged by guide tracks 16a, which may be in the form of angle irons secured to the bottoms of the trough sections 10 and having outer vertical legs depending therefrom along the outsides of the rollers 16.

A shaker conveyor drive mechanism 17 is floatingly mounted on the base 11 on a lower level 18, to one side of the troughs 10. The drive mechanism 17 includes a housing 19 mounted on a base plate 20, floatingly mounted on the base 11 on the level 18 in a manner which will hereinafter be more clearly described as this specification proceeds. As shown in FIGURE 3, the inner wall of the housing 19 extends along a wall 21 of the base 11 and the housing extends along the level 18 into registry with the recessed portion 12 of said base. The shaker conveyor drive mechanism may be of any conventional form and includes a motor 23 mounted on the base plate 20 and having a drive shaft 24 extending within the housing 19 and serving as a drive member for reciprocating drive mechanism contained within said housing, for rockably driving a transverse rock shaft 25 journalled in said housing and extending beyond opposite sides thereof. The shaker drive mechanism 17 may be of a conventional form and is no part of the present invention so need not herein be shown or described further.

The opposite ends of the rock shaft 25 have rocker arms 26 suitably secured thereto and projecting upwardly therefrom. The rocker arms 26 are shown as having bifurcated upper end portions 27, receiving the parallel spaced legs 29 of a yoke 30 in the spaces between the furcations thereof. Pivot pins 31 pivotally connect the legs 29 to the rocker arms 26.

The yoke 30 has a connector 32 extending forwardly therefrom between the furcations of a bifurcated rocker arm 33 mounted on a rock shaft 35. A pivot pin 36 serves to connect the connector 32 to the rocker arm 33. The rock shaft 35 is mounted on a bearing bracket 37 forming an intermediate member in the drive to the troughs 10. The bearing bracket 37 is shown as having a base plate 39 and a right angled abutment plate 40 facing the housing 19 and braced by gusset plates 41 and bearing support blocks 43 forming supports for the bearings for the rock shaft 35, which bearings may be well known forms of self-aligning bearings. The rock shaft 35 has spaced rocker arms 44 suitably secured thereto and projecting upwardly therefrom and spaced to one side of the drive mechanism 17 in general alignment with the conveyor troughs 10. The rocker arms 44 are shown as having bifurcated upper end portions having puller rods 45 extending between the furcations of the bifurcated portions thereof, and pivotally connected thereto by pivot pins 46.

The puller rods 45 extend along the bottom or sides of the trough 10 within generally U-shaped connectors 47 at opposite ends of a drive yoke 49, and are pivotally connected to said connectors as by pivot pins 50. The drive yoke 49 is in the general form of a plate and has an annular ring 51 mounted therein at the transverse center thereof having a yieldable bushing 52 engageable with the inner wall thereof and extending about an annular block 53 concentric with the ring 51 and spaced inwardly therefrom. The annular block 53 has a drive pin 55 mounted therein and extending above and below said block. The pivot pin 55 is mounted in vertically spaced plates 56a and 57a secured to the bottom of the trough 10 and forms a drive member for the troughs 10. It will be noted that the annular ring 51, the bushing 52 and the block 53 extend between the plates 59a and 60a, respectively, secured to the bottom surface of the plate 56a and to the top surface of the plate 57a, to confine the material of the bushing 52 for purposes which will hereinafter more clearly appear as this specification proceeds.

Referring now in particular to certain novel features of the invention including the floating mounting of the housing 19 and the bearing bracket 37 and the yieldable connection from the drive yoke 49 to a drive trough 10, the resultant thrusts from the conveying action are transmitted to the ground through thrust absorbing members 56, spaced to one side of the housing 19 beneath the drive trough 10, and in substantial alignment with the puller rods 45.

As shown in FIGURES 3 and 4, each thrust absorbing member 56 is in the form of an abutment post and extends between the webs of a pair of parallel spaced channels 57 buried in the concrete base 11 with the flanges of said channels facing outwardly. The thrust absorbing members may fit relatively closely between the webs of the channels 57 and may be welded or otherwise secured thereto. An angle iron 59 extends across the thrust absorbing members 56 and has a horizontal leg 60 supported on the thrust absorbing members 56 and a vertical thrust absorbing leg 61 extending downwardly along the thrust absorbing members 56 and abutting the forward faces of said thrust absorbing members, and facing the vertical plate 40 of the bearing bracket 37.

The floating mounting for the shaker conveyor drive mechanism 17 includes through bolts 63 loosely extending through the base plates 20. The through bolts 63 are suitably mounted in the base 11 and extend upwardly therefrom through apertured portions (not shown) of the plate 20. The bolts 63 are sufficiently loose in their apertured portions or bolt holes to allow the housing 19 to slightly slip forwardly and backwardly during operation of the conveyor, for reasons which will hereinafter more clearly appear as this specification proceeds. Opposite sides of the base plate 20 around the bolts 63 are abutted by resilient pads 64, 64. The bottom pads 64 support the base plate 20 on the base 11. The top pads 64 are abutted by metal plates 65 held in position by nuts 66 threaded on the bolts 63. The pads 64 may be made from rubber, an elastomer, nylon or Teflon or any other suitable materials having sufficient resiliency to allow the base plate and housing to shift backwardly and forwardly, to compensate for movement of the bearing bracket 37 with respect to the thrust absorbing elements 56, as will hereinafter more clearly appear as this specification proceeds.

The bearing bracket 37 is supported above the central recessed portion 12 of the base 11 for relative movement with respect to said base in accordance with the resiliency of bearing pads 67, 67 and 69, 69, respectively, interposed between the bearing bracket 37 and the housing 19 and between the thrust absorbing elements 56 and said bearing bracket 37. As shown in FIGURES 2 and 3, a T-shaped abutment member 70 extends across the front of the housing 19 and forwardly therefrom. The abutment member 70 has a vertical head 71 facing the plate 40 of the bearing bracket 37 and extending parallel to said plate. The plate 40 and head 71 are provided with bolt holes 72 on opposite sides of the stem of the T of the T-shaped abutment member 70, said bolt holes only being shown herein in the plate 40 and registering with similar bolt holes 73 in the pads 67 mounted on the head 71 in registry with the bolt holes extending through said head. The pads 67 face the plate 40 and spaced pads 75 extend along the back side of the head 71 on opposite sides of the stem of the T. Metal abutment plates 76 abut the back sides of the pads 75 and are adapted to be engaged by the heads of bolts 77 bolting the bracket 37 to the housing 19 and accommodating relative movement of said bracket with respect to said housing.

The vertical leg 61 of the angle 59 extending across the thrust reaction members 56, has the resilient thrust absorbing pads 69 mounted thereon and facing the plate 40 and secured to said plate in abutting engagement with said plate, as by through bolts 79. The through bolts 79 extend through abutment plates 80 facing the backs of thrust absorbing pads 81, abutting the back face of the vertical leg 61 of the angle 59 (FIGURE 4).

It may be seen from the foregoing that the entire longitudinal reactions from the reciprocating drive of the shaker conveyor drive mechanism are fed into the base through the thrust reaction members 56, and that the loads are transferred from the drive mechanism 17 to the bearing bracket 37 and from the bearing bracket 37 to the thrust reaction members 56 through the resilient pads 67 and 75 and 69 and 81. The resilient pads 69 and 81 provide a slightly resilient connection between the portion of the bearing bracket 37 immediately beneath the shaker conveyor trough 10 and the angle iron 59 welded across the top of the thrust reaction members 56. The resilient pads 67 and 75 also provide a similar impact-absorbing connection between the T-shaped abutment member 70 and the bearing bracket 37 in general alignment with the axes of rocking movement of the rock shafts 25 and 35. The housing 19 being mounted on the base 11 for limited movement with respect to said base in accordance with the resiliency of the bearing pads 64, 64, may thus compensate for relative movement between the parts due to the resiliency of the resilient pads 67, 67, 75, 75, 69, 69 and 81, 81.

It should further be noted that since the resilient pads 67, 67 and 75, 75 are in a plane containing the axes of the rock shafts 25 and 35 that the thrust reactions will be exerted straight through the resilient pads 67, 67 and 75, 75 to the bearing bracket 37. This will thereby avoid any tendency of the bearing bracket 37 to move angularly with respect to the T-shaped abutment member 70. The resilient pads 69, 69 are likewise in the plane of the axis of the shaft 35. The foregoing construction, therefore, allows the casing to float relative to the ground on the resilient pads 64, 64 and enables the thrust reactions of the drive mechanism to be transmitted into the ground through the thrust reaction members 56, 56.

It should here be understood that the resilient pads 67, 67 and 75, 75 and the resilient pads 69, 69 and 81, 81 may be made from material like the material from which the resilient pads 64, 64 are made and that the material used may be selected in accordance with the resiliency required to cushion the joints and mountings of the drive mechanism and the drive from the drive mechanism to the conveyor troughs, to provide resilient connections which will not detract from the essential character of the conveyor as a shaker conveyor.

The resilient bushing 52 between the annular rings 51 and 53 connected to the drive pin 55 also provides a limited amount of resiliency and impact absorption in the drive to the conveyor trough 10. It may be seen from FIGURE 4, that the bushing 52, which is preferably made from rubber or an elastomer, is confined between the plates 59a and 60a welded to the plates 56a and 57a respectively. The spacing between the plates 59a and 60a is substantially the thickness of the annular rings 51 and 53. The bushing 52 and annular rings 51 and 53, therefore, have to be forced into place between the plates 59a and 60a, under pressure. This provides a sufficiently low clearance fit that the rubber in the bushing 52 cannot extrude endwise in response to loads, and can only flow around from one side of its annular cross-section to the other. This utilizes a unique property of rubber, namely that it is incompressible to any practical extent. Thus, when the bushing 52 is completely enclosed in the cylindrical cavity between the annular rings 51 and 53, the rubber of the bushing can merely flow elastically from one side to the other of the bushing, as the puller rods are pulled or pushed. This drive connection to the trough not only reduces the wear formerly present in the drive to shaker conveyor troughs, but also absorbs just enough of the forces produced by the back lash and changes in direction of acceleration to provide the long life required in permanent shaker conveyor installations for use in conveying heavy material, without materially impairing the efficiency of the drive action of the drive unit.

In FIGURES 6 and 7, I have shown the principles of my invention applied to an underneath drive to a shaker conveyor trough line 85, extending over the top of a shaker conveyor drive mechanism 86. The shaker conveyor drive mechanism 86 is like the drive mechanism 17 and has a pair of laterally spaced driving rocker arms 87 extending upwardly therefrom pivotally connected at their upper ends with pull rods 88. The pull rods 88 are pivotally connected to opposite ends of a drive yoke 89 connected to the trough line 85 through a resilient bushing (not shown) as in the form of the invention illustrated in FIGURES 1 through 4. The drive mechanism 86 is mounted on a base plate 90 floatingly mounted on the upper outwardly extending flanges 91 of channels 92 which may be embedded in a single level concrete base 93. Bolts extending through the flanges 91 and loosely through bolt holes in the base plate 90, are provided to floatingly connect said base plate to the channels 92. The bolts 95 extend through resilient pads 96 on opposite sides of the base plate 90 and through abutment plates 97 pressed into engagement with the top resilient pads by nuts 98 threaded on the bolts 95.

The shaker conveyor housing has a generally T-shaped thrust absorbing member 99 mounted thereon having a vertical head 100 facing a vertical leg 101 of an angle 103 extending across and welded to a pair of spaced thrust reaction members 104. The thrust reaction members 104 extend vertically along the webs of the channels 92 and abut the webs of parallel spaced similar channels 105 and are welded or otherwise secured to the webs of said channels. A resilient pad 106 spaces the abutment head 100 from the vertical leg of the angle 103. Metal abutment plates 107 abut the heads of bolts 108 and press abutment pads 109 into engagement with the rear face of the head of the T-shaped abutment member 99. A resilient connection is thus provided between the shaker conveyor drive mechanism 86 and the thrust reaction members 104, to transmit the forces produced by changes in direction of acceleration to the ground through the thrust reaction members 104, and to thereby reduce the driving stresses on the shaker conveyor drive mechanism and relieve the housing for the drive mechanism from the driving strains imparted by the drive forces of conveying and to thereby materially reduce wear on the mechanism itself without impairing the shaking drive action.

It may be seen from the foregoing that an improved shaker conveyor drive mechanism has been provided in which the forces produced by back lash and changes in direction of acceleration of the conveyor are absorbed to the extent necessary to provide a long life shaker conveyor relatively free from wear, without impairing the drive characteristics of the conveyor. It may further be seen that the drive forces are transmitted to the ground through a series of resilient pads and that the resilient pads accommodate the conveyor housing to floatingly move along its base and thereby reduce the driving strains on said housing tending to tear the housing apart as well as the driving strains on the drive gearing contained within said housing.

It may further be seen that with the structure shown and described, the parts may readily be assembled to the base and to the thrust reaction members without precision in manufacturing and still provide a snug fit between the parts and that the resilient pads are so located as to be in general alignment with the push pull reactions of conveying, to avoid the tendency of the drive reactions to unduly tilt the mechanism during the operation of conveying.

While I have herein shown and described one form in which my invention may be embodied, it may readily be understood that various variations and modifications in the invention may be attained without departing from the spirit and scope of the novel concepts thereof.

I claim as my invention:

1. In a shaker conveyor drive unit:
   a base,
   a shaker conveyor trough mounted for reciprocable movement along said base,
   a thrust reaction member secured to said base and extending upwardly therefrom,
   a drive housing, shiftable support means for said drive housing on said base supporting said drive housing for shiftable movement relative said base,
   at least one rocker arm journalled in said housing and reciprocably driven to produce a shaker drive action,
   a drive connection from said rocker arm to said shaker conveyor trough including a resilient connecting member connecting said rocker arm to said shaker conveyor trough,
   and a resilient connection between the drive housing and the thrust reaction member effective to absorb thrust reaction between the drive housing and the thrust reaction member while enabling the housing to shift on the base and thereby maintain the housing relatively free of driving strains.

2. In a shaker conveyor drive unit:
   a base,
   a thrust reaction member fixed to said base and extending vertically therefrom,
   a drive housing having a base plate,
   a shiftable mounting for said drive housing on said base including resilient pads on the top and bottom sides of said base plate and securing means retaining said pads to said base plate and said base and securing said base to said base plate for shiftable movement with respect thereto,
   at least one rocking arm rockably mounted on said housing and reciprocably driven to produce a conveying action,
   a drive connection from said rocking arm to a shaker conveyor for reciprocably driving the same,
   and a resilient pad interposed between said housing and said thrust reaction member effective to absorb thrust reaction between said drive housing and the conveyor while enabling said drive housing to shift on said base to maintain said housing relatively free of driving strains.

3. In a shaker conveyor drive unit:
a base,
a fixed thrust reaction member,
a drive housing supported on said base for shiftable movement relative to said base,
an intermediate member having connections between said drive housing and said thrust reaction member,
a rock shaft journalled on said intermediate member,
a rockable drive shaft on said drive housing and connected with said rock shaft for rockably driving said shaft,
a drive connection from said rock shaft to a shaker conveyor trough line,
at least one of the connections between the housing and the thrust reaction member being resilient and being effective to absorb thrust reaction between the drive housing and the conveyor while enabling the housing to shift on the base to maintain the housing relatively free of driving strains.

4. In a shaker conveyor drive unit:
a base,
a fixed thrust reaction member,
a drive housing supported on said base for shiftable movement relative to said base,
an intermediate member having connections between said drive housing and said thrust reaction member,
a rock shaft journalled on the intermediate member,
driving means extending from the drive housing to the rock shaft and from the rock shaft toward and adapted to be connected to reciprocably drive a shaker conveyor trough line,
and said connections between said drive housing and said intermediate member and said intermediate member and said thrust reaction member being resilient pads effective to absorb thrust reactions between the drive housing of the conveyor, while enabling the housing to shift on the base and maintain the housing relatively free of driving strains.

5. In a shaker conveyor drive unit:
a base,
a fixed thrust reaction member,
a drive housing,
an intermediate member having connections between the drive housing and the thrust reaction member,
a rock shaft journalled on the intermediate member,
driving means extending from the drive housing to the rock shaft and from the rock shaft to drive a shaker conveyor trough line,
means connecting the drive housing to said base and accommodating shiftable movement of said drive housing relative to said base comprising resilient rubber like pads connected between said housing and base,
and at least one of the connections between the drive housing and the thrust reaction member being resilient and thereby being effective to absorb thrust reaction between the drive housing and the conveyor while enabling the housing to shift on the base and thereby maintain the housing relatively free of driving strains.

6. In a shaker conveyor drive unit,
a base,
a thrust reaction member,
a drive housing driving means extending from the drive housing and adapted to be connected to reciprocably drive a shaker conveyor including a pair of puller rods and a yoke,
a resilient drive connection between the yoke and a conveyor trough comprising a completely enclosed rubber like bushing,
and a resilient connection between the drive housing and the thrust reaction member effective to absorb thrust reaction between the drive housing and the conveyor trough while enabling the housing to shift on the base to maintain the housing relatively free of driving strains.

7. In a shaker conveyor drive unit;
a base,
a fixed thrust reaction member secured to said base and projecting upwardly therefrom,
a drive housing supported on said base for limited shiftable movement relative to said base,
an intermediate member having connections between the drive housing and the thrust reaction member,
a rock shaft journalled on said intermediate member,
a rockable drive shaft journalled in said housing parallel to said rock shaft and having a rockable axis lying in the same plane as the axis of said rock shaft,
a rocker arm and link connection between said drive shaft and said rock shaft,
at least one of the connections between the drive housing the intermediate member and the thrust reaction member being resilient and being coplanar with the drive and rock shaft axes to enable the thrust reactions of driving to be exerted straight through said resilient connection to thereby free said intermediate member from twisting forces.

8. In a shaker conveyor drive unit:
a base,
a fixed thrust reaction member,
a drive housing supported on said base for limited shiftable movement relative to said base,
an intermediate member having connections between said drive housing and said thrust reaction member,
a rock shaft journalled on said intermediate member,
a rockable drive shaft journalled in said housing parallel to said rock shaft,
a link and rocking arm connection between said drive shaft and said rock shaft,
said drive shaft and said rock shaft having rockable axes lying in the same plane,
and resilient pads interposed between said drive housing and said intermediate member and between said intermediate member and said thrust reaction member,
means securing said members into abutting engagement with said pads,
said resilient pads and securing means being coplanar with the axes of said rockable drive shaft and said rock shaft and thereby enabling the driving thrust reactions from said drive housing to said thrust reaction member to be exerted directly through said resilient connection without tending to twist said intermediate member.

9. In a shaker conveyor unit and in combination with a shaker conveyor trough,
a drive connection to said trough including a yoke extending transversely of said trough beneath said trough,
puller rods connected to said yoke for reciprocably driving said yoke,
a drive pin mounted in said yoke and extending above and below said yoke for connection with a shaker conveyor trough line,
a resilient drive connection between said yoke and pin including an annular member forming a mounting for said pin,
a rubber-like bushing encircling said annular member and interposed between said yoke and pin and means confining opposite ends of said bushing and forcing the rubber of said bushing to flow from one side to the other of said pin upon reciprocable movement of said yoke effected by back and forth movement of said puller rods.

10. In a shaker conveyor drive unit and in combination with a shaker conveyor trough,
a pair of puller arms reciprocably driven by said drive unit, a yoke connected with said puller arms,
a pair of vertically spaced plates secured to and extending along the bottom of said trough,
said yoke fitting in the space between said plates and the space between said plates being of substantially the thickness of said yoke,
a vertical drive pin,
an annular connector block for said drive pin mounted in said yoke,
there being a cylindrical cavity between said connector and said yoke,
a rubber-like bushing filling said cavity,
said plates confining said bushing to said cavity and forcing said bushing to flow elastically from one side to the other of said drive pin as said puller rods are pulling or pushing on said yoke and trough section.

11. In a shaker conveyor drive unit,
a base,
a thrust reaction member fixed to said base and extending upwardly therefrom,
a drive housing supported on said base and having a base plate projecting from said housing,
means securing said housing to said base for limited shiftable movement with respect to said base including resilient pads interposed between said base plate and said base and other resilient pads in alignment with said first mentioned resilient pads and engaging the top of said base plate,
securing means engaging said other resilient pads and securing said base plate to said base for limited shiftable movement with respect thereto,
an abutment plate extending across an end of said housing,
another abutment plate secured to said thrust reaction member to one side of said housing and in alignment with said first mentioned abutment plate,
an intermediate member resting on said base,
resilient pads interposed between said abutment plate and said intermediate member,
means securing said intermediate member to said abutment plate including through bolts and resilient pads on the opposite sides of said abutment plate and engaged with said abutment plate by said through bolts,
a rock shaft rockingly mounted in said intermediate member,
a parallel rockable drive shaft journalled in said drive housing,
a rocking arm and linkage connection between said drive shaft and said rock shaft,
the axes of rocking movement of said rockable drive shaft and said rock shaft lying in the same plane and said resilient pads being coplanar with the plane of the axes of said shafts and enabling the driving thrust reactions to be exerted straight through said resilient connection and thereby relieving said intermediate member from twisting forces.

References Cited by the Examiner
UNITED STATES PATENTS

| | | |
|---|---|---|
| 2,266,906 | 12/41 | Rapp. |
| 2,894,397 | 7/59 | Brumagin. |
| 2,914,313 | 11/59 | Morris. |

FOREIGN PATENTS

| | | |
|---|---|---|
| 501,843 | 7/30 | Germany. |
| 116,869 | 6/18 | Great Britain. |

SAMUEL F. COLEMAN, *Primary Examiner.*

EDWARD A. SROKA, *Examiner.*